US012529562B2

(12) United States Patent
Soliman et al.

(10) Patent No.: US 12,529,562 B2
(45) Date of Patent: Jan. 20, 2026

(54) COMPLIANT STOPS FOR MEMS INERTIAL DEVICE DRIVE PLL STABILITY

(71) Applicant: NXP USA, Inc., Austin, TX (US)

(72) Inventors: Mostafa Soliman, Waterloo (CA); Aaron A. Geisberger, Austin, TX (US); Margaret Leslie Kniffin, Chanlder, AZ (US); Raghavendra N. Sridhar, Queen Creek, AZ (US)

(73) Assignee: NXP USA, INC., Austin, TX (US)

( * ) Notice: Subject to any disclaimer, the term of this patent is extended or adjusted under 35 U.S.C. 154(b) by 305 days.

(21) Appl. No.: 18/221,923

(22) Filed: Jul. 14, 2023

(65) Prior Publication Data

US 2025/0020464 A1  Jan. 16, 2025

(51) Int. Cl.
  *G01P 15/10*  (2006.01)
  *G01C 19/5719*  (2012.01)
  (Continued)

(52) U.S. Cl.
  CPC .......... *G01C 19/5719* (2013.01); *G01P 15/08* (2013.01); *G01C 19/5607* (2013.01); *G01P 2015/0862* (2013.01); *G01P 2015/0871* (2013.01); *G01P 2015/0882* (2013.01); *G01P 15/10* (2013.01)

(58) Field of Classification Search
  None
  See application file for complete search history.

(56) References Cited

U.S. PATENT DOCUMENTS

| 5,969,249 A * | 10/1999 | Roessig | G01P 15/0802 |
| | | | 73/514.36 |
| 6,360,605 B1 * | 3/2002 | Pinter | B81B 3/0051 |
| | | | 73/514.32 |

(Continued)

FOREIGN PATENT DOCUMENTS

DE  102011006397 A1 * 10/2012 ......... G01C 19/5755

OTHER PUBLICATIONS

Michael Naumann et al., Design and Application of Flexible Stops for MEMS Devices, Sensors, 2010 IEEE, Waikoloa, HI, USA, Nov. 2010, pp. 168-173, doi: 10.1109/ICSENS.2010.5690685.

(Continued)

*Primary Examiner* — Douglas X Rodriguez
*Assistant Examiner* — Ruben C Parco, Jr.

(57) ABSTRACT

A MEMS inertial sensor device, method of operation, and fabrication process are described with a MEMS inertial sensor, drive actuation unit, drive measurement unit, and PLL circuit coupled together in operational engagement, where the MEMS inertial sensor includes a substrate, a proof mass positioned in spaced apart relationship above the substrate, a proof mass suspension member connected on a first end to the proof mass and connected on a second end to an anchor fixed to the substrate to enable the proof mass to laterally oscillate over the surface of the substrate, and a compliant stop structure positioned in relation to the proof mass suspension member to physically engage with lateral oscillating movement of the proof mass suspension member past a desired stroke travel distance without physically preventing lateral oscillating movement of the proof mass, thereby stiffening a spring stiffness measure of the proof mass suspension member.

10 Claims, 8 Drawing Sheets

(51) Int. Cl.
*G01P 15/08* (2006.01)
*G01C 19/5607* (2012.01)

(56) References Cited

U.S. PATENT DOCUMENTS

| | | |
|---|---|---|
| 6,865,944 B2 | 3/2005 | Glenn et al. |
| 8,011,247 B2 | 9/2011 | Glenn |
| 8,186,220 B2 | 5/2012 | Geisberger et al. |
| 8,222,754 B1 | 7/2012 | Soliman et al. |
| 8,952,466 B2 | 2/2015 | Classen et al. |
| 9,835,455 B2 | 12/2017 | Cassagnes et al. |
| 10,119,822 B2 | 11/2018 | Cassagnes et al. |
| 10,502,759 B2 | 12/2019 | Geisberger |
| 2002/0178817 A1* | 12/2002 | Selvakumar .......... G01P 15/125 73/514.01 |
| 2004/0129077 A1* | 7/2004 | Franz .................... G01P 15/08 73/652 |
| 2010/0223997 A1 | 9/2010 | Geisberger et al. |
| 2013/0099836 A1 | 4/2013 | Shaeffer et al. |
| 2013/0214367 A1* | 8/2013 | van der Heide ....... H10D 48/50 257/415 |
| 2014/0260613 A1 | 9/2014 | Qiu et al. |
| 2016/0290804 A1 | 10/2016 | Cassagnes et al. |
| 2022/0194781 A1* | 6/2022 | Partanen ............... B81B 3/0051 |
| 2022/0194782 A1* | 6/2022 | Partanen ............... B81B 3/0051 |
| 2023/0204620 A1* | 6/2023 | Seshia ...................... G01P 1/00 73/514.29 |
| 2023/0296643 A1* | 9/2023 | Darmanin ............. G01L 5/0052 73/514.32 |

OTHER PUBLICATIONS

Yang Gao et al., Design and Implementation of a Dual-Mass MEMS Gyroscope with High Shock Resistance, Sensors 18(4):1037, Mar. 2018, DOI:10.3390/s18041037.

* cited by examiner

COMPLIANT STOPS FOR MEMS INERTIAL DEVICE DRIVE PLL STABILITY

BACKGROUND OF THE INVENTION

Field of the Invention

The present disclosure is directed in general to the field of phase locked loop (PLL) semiconductor devices. In one aspect, the present disclosure relates to microelectromechanical systems (MEMS) gyroscope devices and methods for operating same to support PLL operational stability.

Description of the Related Art

Micro-Electro-Mechanical Systems (MEMS) technology is increasingly used to integrate mechanical elements, sensors, actuators, and electronics on a common silicon substrate through microfabrication technology. For example, inertial sensors may be formed with MEMS devices on an integrated circuit wafer substrate to form various applications, such accelerometers for measuring linear acceleration, gyroscopes for measuring angular velocity, optical devices, pressure sensors, switches, and so forth. A conventional MEMS device typically includes a moveable element, such as a proof mass, diaphragm, mirror, and the like that is flexible or movable, and is attached to the rest of the device. The proof mass is resiliently suspended by one or more suspension springs such that it moves when the MEMS gyroscope experiences angular velocity. Relative motion between this movable element and the rest of the device is driven by actuators and/or sensed by sensors in various ways, depending on device design. The motion of the proof mass may then be converted into an electrical signal having a parameter magnitude (e.g., voltage, current, frequency, etc.) that is proportional to the angular velocity. In some instances, a MEMS gyroscope may experience harsh accelerations or a relatively high force. In such an instance, the proof mass can move beyond a desired distance. Such movement can potentially damage the MEMS gyroscope. Additionally, the MEMS gyroscope can exhibit unstable behavior if the proof mass, sense electrodes, and/or other portions of the MEMS device travel too far when a voltage is applied to the MEMS device. In addition, if the proof mass is driven by electrostatic forces, electrode collapse or shortening may occur due electrostatic force instability causing fingers/electrodes snapping.

To protect against excessive movement of the proof mass, many MEMS gyroscopes include one or more types of distance limiters, typically referred to as over-travel stops or hard stops. These over-travel stops are arranged to limit the movement of the proof mass and/or other portions of the MEMS gyroscope, thereby preventing the MEMS proof mass from travelling to a point where damage may occur to the sensor due to the high induced mechanical stresses/strains in the suspension beams. While over-travel stops do provide protection against mechanical stresses on the proof mass elements, MEMS gyroscopes typically have requirements, or specifications, for overload performance which place tight restrictions on the over-travel stop structure. For example, the over-travel stop must allow the proof mass to travel a specific distance with little variation in accuracy over a relatively large range of operating conditions. In addition, specific circuit applications for the MEMS gyroscopes can impose operational constraints on the design of the over-travel stops and/or proof mass. As a result, the existing design, operation, and manufacturability of integrated circuit MEMS gyroscopes are extremely difficult to implement at a practical level.

BRIEF DESCRIPTION OF THE DRAWINGS

The present disclosure may be understood, and its numerous objects, features and advantages obtained, when the following detailed description of a preferred embodiment is considered in conjunction with the following drawings.

DETAILED DESCRIPTION

A method and apparatus are described for fabricating compliant or soft stop structures for MEMS inertial transducer elements (i.e., gyroscope transducers) to promote Phase Locked Loop (PLL) drive stability by designing the compliant or soft stop structures to selectively stiffen the proof mass suspension in a way to smooth and limit frequency changes that will keep the resonant frequency of the MEMS gyro drive loop in the phase control range of the drive PLL circuits. In selected embodiments, compliant or soft stop structures are formed with a MEMS inertial transducer element by selectively patterning and etching one or more proof mass layers to define a proof mass, spring cantilever element, and adjacent soft stop structures that are positioned adjacent to the spring cantilever element to smooth or limit frequency changes from the proof mass suddenly engaging with a hard stop structure. In other selected embodiments, compliant or soft stop structures are formed with a MEMS inertial transducer element by selectively patterning and etching one or more proof mass layers to define a proof mass with a folded beam spring having internal truss having compliant stop extensions that have specified clearance distances from the proof mass to smooth or limit frequency changes from the proof mass suddenly engaging with a hard stop structure. In alternative selected embodiments, the compliant or soft stop structures are formed as part of the MEMS inertial transducer element by selectively patterning and etching the proof mass layer(s) so that the compliant stop extensions are integrated with the proof mass and separated from an interior folded beam spring structure by a specified clearance distance to smooth or limit frequency changes from the proof mass suddenly engaging with a hard stop structure. With appropriately positioned compliant or soft stop structures, the MEMS inertial transducer element has a higher probability of operating in the PLL stability region since the compliant or soft stops provide more stiffening against high over-drive motion by the proof mass.

Figure 1:
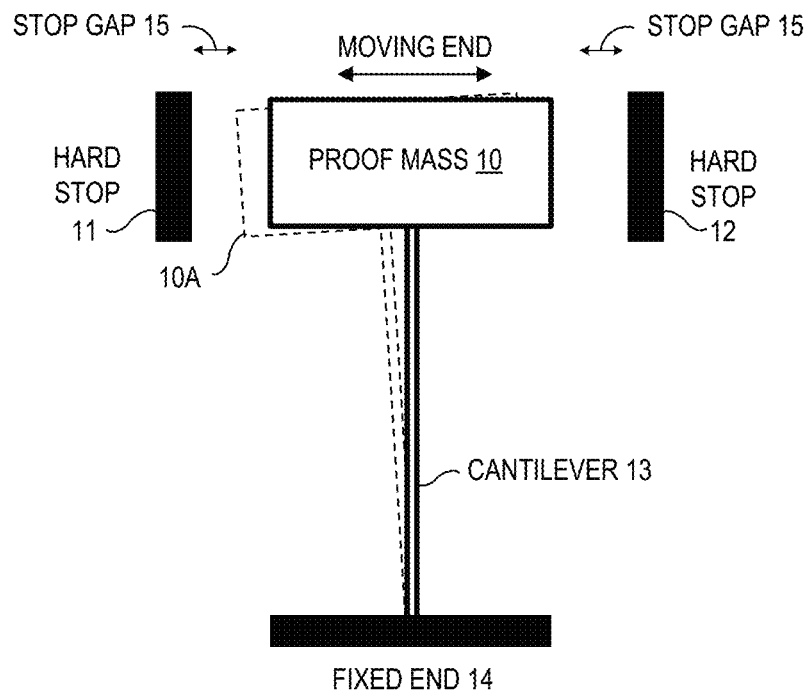
FIG. 1 is a simplified functional diagram schematically illustrating a plan view of a vibrating MEMS proof mass with hard stops positioned to prevent over-travelling of the MEMS proof mass.

Referring now to FIG. 1, there is shown is a simplified functional diagram 1 which schematically illustrates a plan view of a vibrating MEMS gyroscope proof mass 10, 10A with hard stops 11, 12 positioned to prevent over-travelling of the MEMS proof mass. Though shown as simplified geometric shape, the proof mass 10 may have any suitable shape and may be formed with one or more patterned semiconductor layers which are suspended above an underlying substrate via a cantilever suspension beam element 13 that is fixedly connected to a fixed or anchor end 14 which is fixed to the substrate. Though shown in simplified form, it will be appreciated that the cantilever 13 represents one or more compliant members or springs that interconnect the proof mass 10 to the fixed end 14. In addition, the proof mass 10 may include one or more movable electrodes (not shown) which move with the proof mass 10, 10A as it vibrates or oscillates. In addition, one or more fixed electrodes (not shown), such as sense electrode and/or actuator electrodes, may be attached to the substrate and positioned in communicative engagement with the one or more movable electrodes on the proof mass 10. Illustrated as a single axis MEMS gyroscope proof mass 10, the cantilever 13 enables movement of the proof mass 10 in an x-axis direction in response to electrical drive signals applied to the movable and fixed drive electrodes. And in response to angular rotation about a sense axis, the motion of the MEMS gyroscope proof mass 10 changes, thereby altering the capacitance between movable and fixed electrodes such that the differential or relative capacitance indicates the angular rotation.

On adjacent sides of the proof mass 10, hard stops 11, 12 are provided to limit over-drive movement of proof mass 10, such as can occur when the MEMS gyroscope proof mass experiences harsh or excessive acceleration or rotational movement. Thus positioned, the hard stops 11, 12 prevent the proof mass 10 from travelling laterally to a point where damage may be caused from induced mechanical stresses/strains in the cantilever suspension beam 13. In addition, the hard stops 11, 12 are positioned to protect against damage to the proof mass 10 that can occur when driven into the stops by electrostatic forces. This can cause electrode collapse and/or shortening. Typically, over-travel hard stops 11, 12 are anchored, or attached, to the substrate. It should be noted that when proof mass 10 is not subjected to excessive acceleration or rotational movement, it will oscillate or vibrate at a specified resonant frequency such that there is a separation distance or stop gap 15 between the hard stops 11, 12 and the maximum lateral displacement position of the proof mass 10. Thus, the stop gap 15 defines the distance that proof mass 10 is allowed to travel, or move, until it hits one or more of the hard stops 11, 12.

Figure 2:
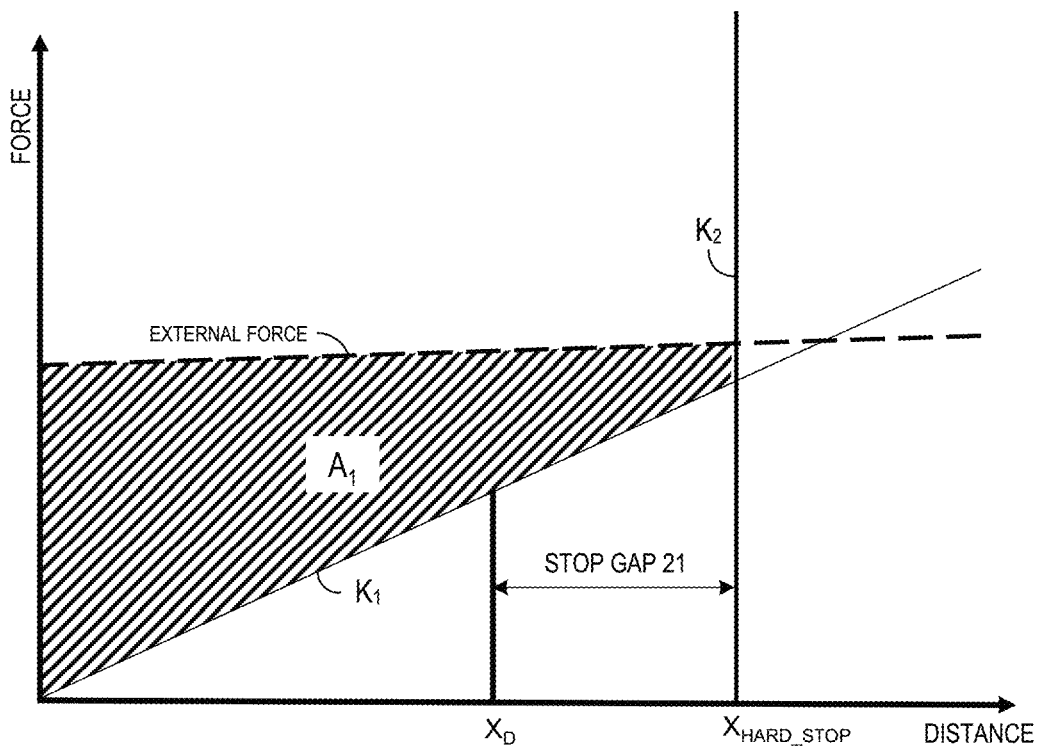
FIG. 2 illustrates a force-displacement diagram for a MEMS gyroscope with hard stops positioned to prevent over-travelling of the MEMS proof mass.

To provide additional details for an improved contextual understanding of selected embodiments of the present disclosure, reference is now made to FIG. 2 which illustrates a force-displacement distance diagram 2 for a MEMS gyroscope with hard stops positioned to prevent over-travelling of the MEMS proof mass. As depicted, the hard stops are located at a lateral distance ($X_{HARD\_STOP}$), the desired lateral travel stroke is located at lateral distance ($X_D$), and these are separated from one another by a stop gap distance measure 21. As depicted, the area under the external force line is the input mechanical energy, while area under the restoring spring stiffness (spring constant $K_1$) is the stored potential energy in the spring which is called the decelerating energy since it tries to oppose the mass motion. If the external force is too large to be countered by the restoring spring force, part of the input energy will be stored in the moving proof mass of the system as a kinetic energy, thereby accelerating the proof mass towards the hard stop. This is called accelerating energy ($A_1$) since it accelerates the proof mass to move. The larger the amount of accelerating energy in the proof mass when it hits the hard stop, the longer the time the proof mass stays in contact with the hard stop. This leads to more stiffness (hard stop stiffness) to be added during part of the cycle of oscillation. In return, the average stiffness over one cycle will increase, thereby increasing the device resonant frequency. As seen from the foregoing, the hard stop creates a two-stage stiffness relationship, where displacements in a first stage face a softer resistance (embodied by a low stiffness $K_1$) and displacements in a second stage face a very large or infinite resistance (embodied by a higher stiffness $K_2$). This bi-linear stiffness relationship transforms the gyroscope from a linear oscillator (prior art) into a bi-linear oscillator where the resonant frequency suddenly shifts when the proof mass contacts the hard stops. Such shifts in the resonant frequency can be problematic in applications where a MEMS gyroscope is connected with other circuitry to provide an inertial sensor function. For example, a MEMS gyroscope may have its drive electrodes connected to be driven by a drive phase locked loop (PLL) circuit which has a defined or limited range of operational frequencies that it can support. If the drive PLL circuitry cannot handle an abrupt change or shift in the resonant frequency of the MEMS gyroscope, the sensor drive PLL loop may get unlocked, causing the failure of operation and a device restart sequence.

Figure 3:
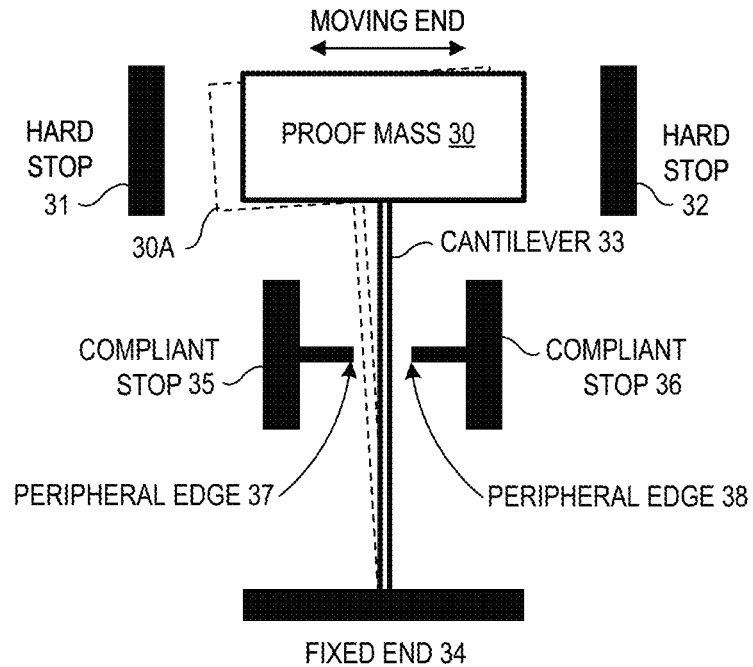
FIG. 3 is a simplified functional diagram schematically illustrating a plan view of a MEMS gyroscope proof mass with compliant stops positioned adjacent to a proof mass spring cantilever element to smooth/limit frequency changes from the proof mass in accordance with selected embodiments of the present disclosure.

To provide additional details for an improved understanding of selected embodiments of the present disclosure, reference is now made to FIG. 3 which depicts a simplified functional diagram 3 schematically illustrating a plan view of a MEMS gyroscope proof mass 30, 30A which includes hard stops 31, 32 that are positioned to prevent over-travelling of the MEMS proof mass 30, but also includes soft or compliant stops 35, 36 that are positioned adjacent to the proof mass spring cantilever element 33 to smooth/limit frequency changes from the proof mass 30. Similar to the proof mass 10 shown in FIG. 1, the proof mass 30 is illustrated with a simplified geometric shape, but may have any suitable shape and may be formed with one or more patterned semiconductor layers which are suspended above an underlying substrate via a cantilever suspension beam element 33 that is fixedly connected to a fixed or anchor end 34. Similarly, the cantilever 33 may have any suitable shape or structure, such as one or more compliant members or springs that interconnect the proof mass 30 to the fixed end 34. In addition, the proof mass 30 may include one or more movable electrodes (not shown) which are used to move with the proof mass 30, 30A as it vibrates or oscillates, and one or more fixed electrodes (not shown), such as sense electrode and/or actuator electrodes, may be attached to the substrate and positioned in communicative engagement with the one or more movable electrodes on the proof mass 30. And similar to the hard stops 11, 12 shown in FIG. 1, the hard stops 31, 32 are formed and positioned on adjacent sides of the proof mass 30 to limit over-drive movement of proof mass 30.

In addition, soft or compliant stops 35, 36 are formed and positioned on adjacent sides of the cantilever 33 to smooth/limit frequency changes from the proof mass 30 that can occur when the MEMS gyroscope proof mass experiences harsh or excessive acceleration or rotational movement and exceeds its desired travel range. To this end, the compliant stops 35, 36 are designed and positioned to interact with the proof mass suspension structure (e.g., 33) just after the proof mass 30 exceeds its desired travel range and before the proof mass 30 interacts or impacts the hard stops 31, 32, thereby guaranteeing a smooth and a limited frequency change that will keep the resonant frequency of the MEMS gyro drive loop in the phase control range of the drive PLL circuits. In particular, each compliant stop 35, 36 includes a peripheral interior edge element 37, 38 which is positioned to engage with a laterally moving cantilever 33 before the proof mass 30 engages with the hard stops 31, 32. As a result of properly positioning the compliant stops 35, 36, the proof mass suspension structure (e.g., 33) is effectively stiffened against high over drive motion, thereby ensuring a higher probability the sensor will be in the PLL stability region. While the complaint stops 35, 36 do help reduce or smooth the abrupt frequency change due to the engagement of the hard stops 31, 32, it will be appreciated that strong external forces can still cause the proof mass 30 to hit the hard stops 31, 32, but with less dynamic energy since part of the input mechanical energy will be stored in the new added spring stiffness due to the compliant stops 35, 36.

Figure 4:
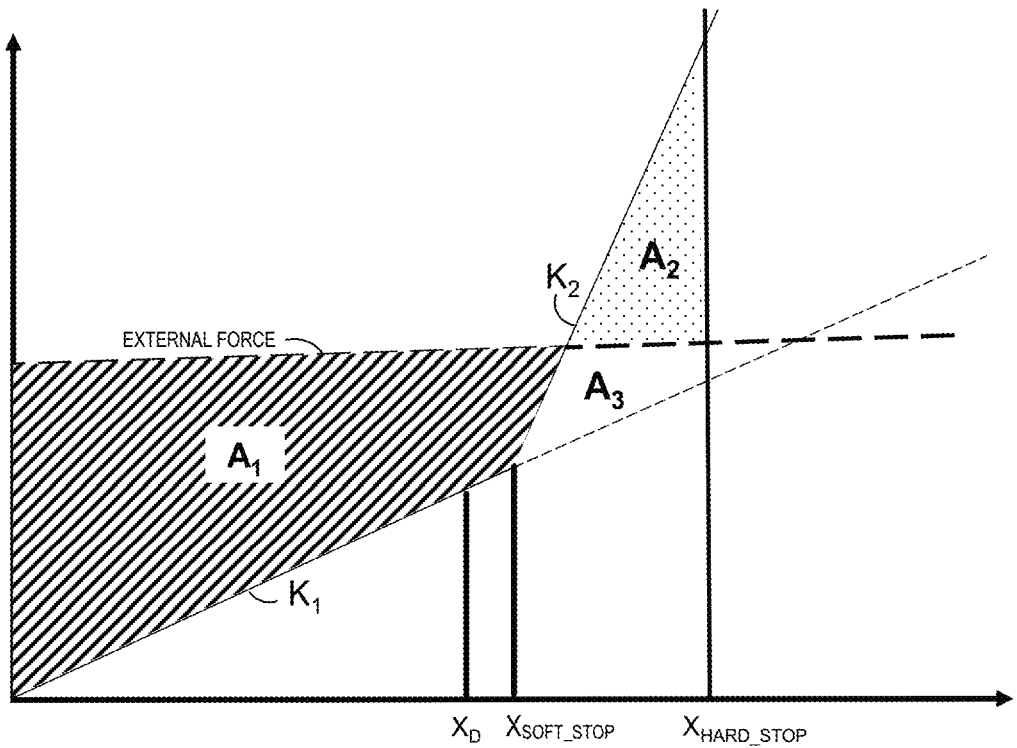
FIG. 4 illustrates a force-displacement diagram for a MEMS gyroscope with compliant stops positioned adjacent to a proof mass spring cantilever element to smooth/limit frequency changes from the proof mass in accordance with selected embodiments of the present disclosure.

To provide additional details for an improved understanding of selected embodiments of the present disclosure, reference is now made to FIG. 4 which illustrates a force-displacement distance diagram 4 for a MEMS gyroscope with hard stops and with compliant stops positioned adjacent to a proof mass spring cantilever element to smooth/limit frequency changes from the proof mass. As depicted, the hard stops are located at a lateral distance ($X_{HARD\_STOP}$), the compliant or soft stops are located at a lateral distance ($X_{SOFT\_STOP}$), and the desired lateral travel stroke is located at lateral distance ($X_D$). As depicted, the area under the external force line is the input mechanical energy, while area under the restoring spring stiffness or constant values $K_1$, $K_2$ is the stored potential energy in the spring. If the external force is too large to be countered by the restoring spring force, part of the input energy will be stored in the moving proof mass of the system as a kinetic energy, thereby accelerating the proof mass towards the hard stop. This is called accelerating energy ($A_1$) since it accelerates the proof mass to move. However, by adding the soft or compliant stops, the stiffness of the spring is increased over the original device stiffness just after the desired motion limit is achieved. As a result, the amount of accelerating energy is reduced by the area $A_3$, and more decelerating energy will be added to the energy system by the amount of $A_2$. As a result of adding the soft or compliant stops, there is a reduction in the amount of accelerating energy that the proof mass hits the hard stops with, thereby reducing the amount of frequency change for the system.

As will be appreciated, the positioning of the compliant stops can be adjusted to increase the amount of decelerating energy $A_2$ over the amount of accelerating energy $A_1$ to further mitigate or reduce the hard stop engagement by the proof mass, but this comes at the expense of increased nonlinearity. In particular, the amount of the decelerating energy can be controlled by the location of the compliant stop that controls the amount of $K_2$. If area $A_2$ is designed to be bigger than area $A_1$, the proof mass will not engage with the hard stop. This approach will not mitigate the frequency increase but will develop a smooth frequency change and with frequency shift even smaller than hitting the hard stop. By attenuating or reducing shifts in the resonant frequency, a MEMS gyroscope connected with drive PLL circuit will have a better opportunity to adjust for the new frequency, thereby reducing the likelihood that the drive PLL is pushed out of operation or gets unlocked.

Figure 5:
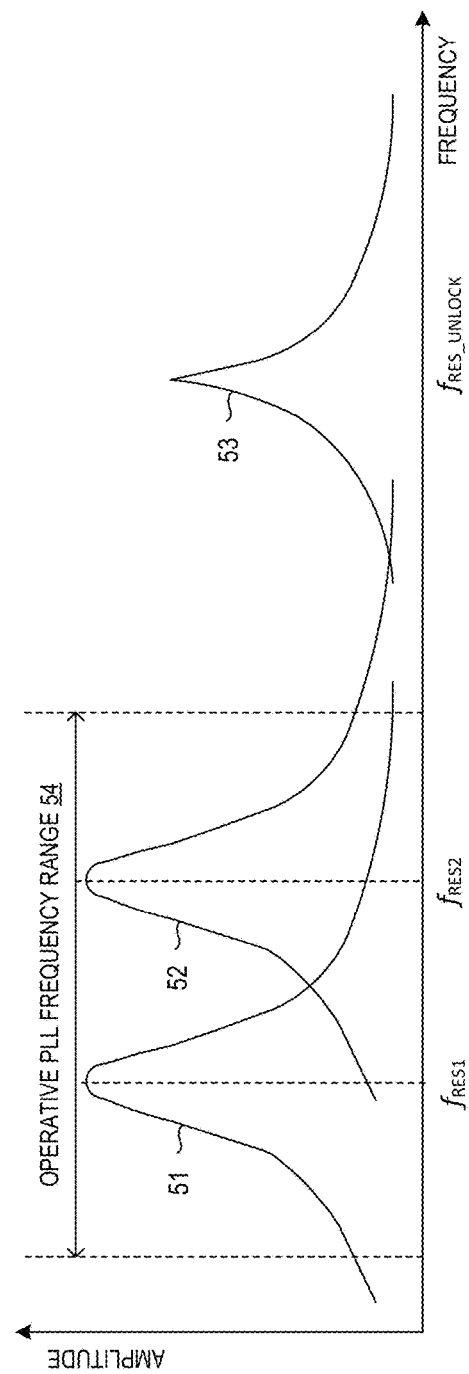
FIG. 5 illustrates an amplitude-frequency diagram comparatively illustrating the changes in frequency resonance for a MEMS gyroscope design which includes hard stops positioned to prevent over-travelling of the MEMS proof mass and for a MEMS gyroscope design which also includes compliant stops positioned to smooth/limit frequency changes from the proof mass in accordance with selected embodiments of the present disclosure.

To provide additional details for an improved understanding of selected embodiments of the present disclosure, reference is now made to FIG. 5 which illustrates an amplitude-frequency diagram 5 for comparatively illustrating the changes in frequency resonance for first and second MEMS gyroscope designs. The first MEMS gyroscope design corresponds to the example design depicted in FIG. 1, and includes a proof mass with hard stops positioned to prevent over-travelling of the MEMS proof mass, but without including compliant stops. In turn, the second MEMS gyroscope design corresponds to the example design depicted in FIG. 3, and includes a proof mass with hard stops and with compliant stops that are positioned to smooth/limit frequency changes from the proof mass in accordance with selected embodiments of the present disclosure.

In the first MEMS gyroscope design, gyroscope may be connected to a drive PLL circuit which, in normal operation, operates at a first specified resonant frequency $f_{RES1}$ which is proportional with the stiffness of the spring and which is illustrated with the amplitude-frequency waveform 51. As will be appreciated, a PLL circuit connected to a MEMS gyroscope sensor will have an operative PLL frequency range 54 which defines a capture range of operation where the phase lock can be sustained. However, when subjected to an external force, such as a mechanical shock or vibration, additional energy may be imparted to the proof mass, causing it to engage with the hard stops. As a consequence, there may be a significant increase in the resonant frequency, as shown with the amplitude-frequency waveform 53 where the resonant frequency $f_{RES\_UNLOCK}$ is outside of the operative PLL frequency range 54. In such situations, any abrupt change in resonance frequency caused by hard stop impact can cause the phase difference to drop to zero so that the PLL is circuit is no longer be capable of managing this frequency change, and that may push the drive phase locked loop (PLL) out of operation and the sensor drive loop gets unlocked, causing failure of operation and expensive reboot sequencing which is a reliability issue. This might be explained as the substantial abrupt increase of the drive stiffness over a small part of the oscillation cycle during hard stopper impact/engagement. As a result of hard stop impact, the average stiffness value over one cycle is higher than the nominal stiffness value during normal operation without hard stop engagement.

In the second MEMS gyroscope design, the normal operation of the gyroscope and connected drive PLL circuit will also operate at the first specified resonant frequency $f_{RES1}$ which is illustrated with the amplitude-frequency waveform 51. However, when subjected to an external force which imparts additional energy to the proof mass, the proof mass engages with the compliant stops before impacting the hard stops, resulting in a relatively small stiffening of the spring cantilever element against high over drive motion. For example, by positioning the compliant stops at a first clearance distance from the spring cantilever element that is shorter than a second clearance distance between the proof mass and the hard stops, the spring cantilever element will engage with the compliant stops before the proof mass engages with the hard stops, at least for an initial range of additional energy being imparted to the proof mass. As a consequence of increasing the stiffness of the spring cantilever element with the complaint stops, there may be a relatively small increase in the resonant frequency, as shown with the amplitude-frequency waveform 52 where the resonant frequency $f_{RES2}$ is still inside the operative PLL frequency range 54 and can therefore be managed by the PLL circuit which must be able to accommodate for both the drive loop frequency change and the frequency change rate as well. In selected embodiments, the design and positioning of the compliant stopper are controlled to result in a frequency change that is smaller than the operative frequency range 54 of the specifications for the PLL circuit.

Figure 6:
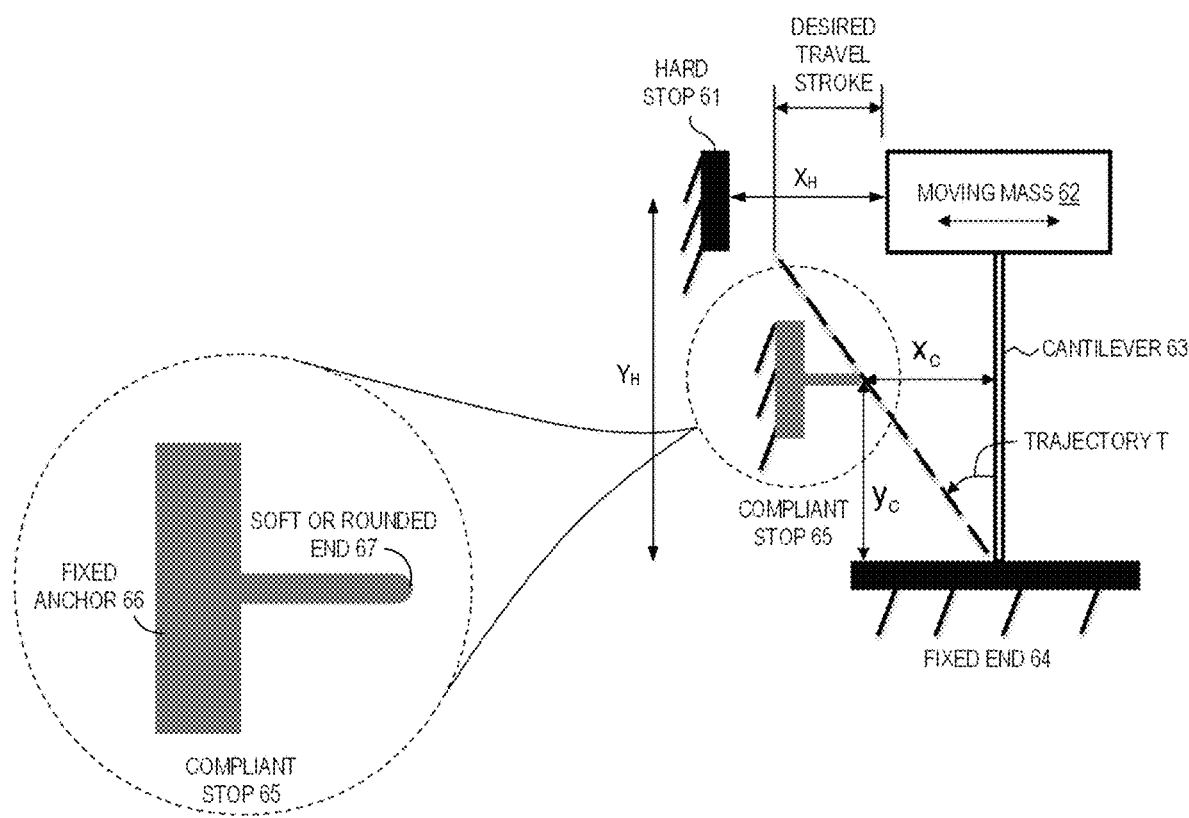
FIG. 6 illustrates a simplified plan view of a MEMS gyroscope proof mass with hard stops and compliant stops positioned adjacent to a proof mass spring cantilever element to smooth/limit frequency changes from the proof mass in accordance with selected embodiments of the present disclosure.

Referring now to FIG. 6, there is shown a simplified plan view 6 of a MEMS gyroscope proof mass 62 with hard stops 61 and compliant stops 65 positioned on one side adjacent to a proof mass spring cantilever element 63 to smooth/limit frequency changes from the proof mass in accordance with selected embodiments of the present disclosure. While the moving proof mass 62 is illustrated with a simplified geometric shape, it will be appreciated that any suitable shape may be formed with one or more patterned semiconductor layers which are suspended above an underlying substrate via a cantilever suspension beam element 63 that is fixedly connected to a fixed or anchor end 64. Similarly, the cantilever 63 may have any suitable shape or structure, such as one or more compliant members or springs that interconnect the proof mass 62 to the fixed end 64. In addition, the hard stop 61 is illustrated as being formed with simple geometric shape that is fixed to the substrate, and the compliant stop 65 is also illustrated as including a fixed anchor section 66 and soft or rounded peripheral end portion 67. In selected embodiments, the compliant stop 65 includes a curved or rounded profile for the peripheral end portion 67 which helps reduce impact damage from the cantilever suspension beam element 63 hitting the compliant stop 65.

As depicted, both the hard stop 61 and compliant stop 65 provide over-travel motion limitation for the proof mass 62, but they are positioned at different lateral separation distances to provide different types of over-travel motion limitation. In particular, the hard stop 61 is formed as a fixed structure that is attached to the substrate and that is positioned at a lateral separation or clearance distance $X_H$ from the proof mass 62, where the clearance distance $X_H$ is controlled to prevent the proof mass 62 from travelling to a point where damage may occur due to the high induced mechanical stresses/strains in the proof mass spring cantilever element 63. In addition, the compliant stop 65 is also formed as a fixed structure that is attached to the substrate, but it is positioned at a lateral separation or clearance distance $X_C$ from the proof mass spring cantilever element, where the clearance distance $X_C$ is controlled to increase the stiffness of the proof mass spring cantilever element 63, thereby reducing the likelihood that the proof mass 62 will impact the hard stop 61 which would result in an abrupt frequency change due to the engagement of the hard stop 61.

In selected embodiments, the lateral separation or clearance distance $X_H$ for the hard stop 61 is selected and controlled to be larger than the desired stroke travel distance for the moving proof mass 62 so that the proof mass 62 does not impact the hard stop 61 during normal operation. In similar fashion, the vertical and lateral separation or clearance distances $X_C$, $Y_C$ for the compliant stop 65 are selected and controlled to ensure that the moving proof mass spring cantilever element 63 does not impact the compliant stop 65 when the proof mass 62 is vibrating or oscillating within the desired stroke travel distance during normal operation. However, when external forces cause the moving proof mass 62 to exceed the desired travel stroke distance, the location coordinates $X_C$, $Y_C$ for the compliant stop 65 ensure that the moving proof mass spring cantilever element 63 engages with the compliant stop 65 before the moving proof mass 62 engages with the hard stop 61. This contact with the compliant stop 65 will effectively shorten the length of the moving proof mass spring cantilever element 63, thereby increasing its stiffness. In turn, the increased cantilever stiffness will reduce the motion of the moving proof mass 62, thereby reducing its probability of hitting the hard stop 61 and increasing the resonant frequency of the whole resonating structure. If this incremental increase in the resonant frequency can be handled by the PLL circuitry, then the resonating drive loop will stay locked and controlled until the effect of the external force diminishes and clears so the PLL will keep locked until normal operation is restored.

As disclosed herein, the location coordinates $X_C$, $Y_C$ for the soft or rounded peripheral end portion 67 of the compliant stop 65 are located on the beam bending trajectory T which is shown, for simplified illustration purposes as a straight line. However, persons skilled in the art will appreciate that the location coordinates $X_C$, $Y_C$ for the compliant stop 65 may be correlated based on the beam bending shape function for the moving proof mass spring cantilever element 63. In particular, the moving proof mass spring cantilever element 63 will, upon impact with the compliant stop 65, have an inflection or bending point at the point of impact with the soft or rounded peripheral end portion 67 of the compliant stop 65. The smaller the vertical location coordinate $Y_C$ along the trajectory line T, the smaller the stiffness change after the moving proof mass 62 engages with the compliant stop 65, and the smaller the resonant frequency increase which leads to more stable PLL circuit performance. In effect, shorter values for the vertical location coordinate $Y_C$ result in longer effective drive stroke distances after engagement with the compliant stop 65. In effect, shorter values for the vertical location coordinate $Y_C$ result in longer effective drive stroke distances after engagement with the compliant stop 65, thereby increasing the risk of hitting the hard stops. Conversely, with increases in the vertical location coordinate $Y_C$ along the trajectory line T, there will be larger stiffness changes after the moving proof mass 62 engages with the compliant stop 65, resulting in larger increases in the resonant frequency which leads to less stable PLL circuit performance but with advantage of less risk to hit the hard stop. As will be appreciated, persons skilled in the art will make compromises and trade-offs when setting the location coordinate values, $X_C$, $Y_C$.

As seen from the foregoing, the compliant stop 65 is positioned to control the stiffness of the moving proof mass spring cantilever element 63 and the corresponding amount of the incremental frequency increase by the moving proof mass 62 so as to comply with the specifications of the PLL circuitry. However, it will be appreciated that high external forces can still cause the moving proof mass 62 to engage with the hard stop 61, even after first engaging with the compliant stop 65. Even so, the compliant stop 65 provides a performance advantage since it reduces the amount of energy from the moving proof mass 62 when it hits the hard stop 61, thereby reducing the frequency change and the unlock probability.

As disclosed herein, one or more compliant stops may be positioned on either or both sides of an oscillating proof mass spring cantilever element. For example, two or more compliant stops may be positioned at different distances from the proof mass spring cantilever element to incrementally add more stiffness to the oscillating proof mass upon impacting each compliant stop. In this way, the resonant frequency of the proof mass may be slowly increased as the proof mass spring cantilever element impacts each compliant stop structure(s). In the example of FIG. 6, the compliant stop 65 may be located at first location coordinates $X_C$, $Y_C$, and a second compliant stop (not shown) may be located at the second location coordinates $X'_C$, $Y'_C$, where $X'_C < X_C < X_H$ and $Y'_C < Y_C < Y_H$. As disclosed herein, the addition of multiple compliant stops at different lateral spacing from the oscillating cantilever can be placed on one side of the oscillating cantilever, in which case the vertical location coordinates $X_C \neq X'_C$. In other embodiments, the addition of multiple compliant stops at different lateral spacing from the oscillating cantilever can be placed on both sides of the oscillating cantilever, in which case the vertical location coordinates $X_C$, $X'_C$ may or may not have the same value. Thus, for different embodiments, the compliant stop configurations may be implemented with one compliant stop positioned at one side of the oscillating spring/cantilever, with two compliant stops positioned on opposed sides of the oscillating spring/cantilever at equal lateral distances from the oscillating spring/cantilever, with two compliant stops positioned at one side of the oscillating spring/cantilever at different vertical and lateral distances, or with two compliant stops positioned on opposed sides of the oscillating spring/cantilever at different lateral distances from the oscillating spring/cantilever.

While FIG. 6 illustrates selected example embodiments for designing compliant stops to engage with the proof mass suspension, it will be appreciated that other compliant stop designs can be employed in accordance with selected embodiments of the present disclosure, depending on the design of the moving proof mass. For example, reference is now made to FIG. 7 which illustrates a simplified plan view 7 of a MEMS gyroscope proof mass 70 connected over a suspension frame structure 71 to a fixed anchor 77. Though not shown, it will be appreciated that hard stop structures may be located on the left and right sides of the proof mass and positioned at a lateral separation or clearance distance $X_H$. While the proof mass 70 is illustrated in simplified form as a rectangular shape with a central opening in which the suspension frame structure 71 is formed, it will be appreciated that any suitable shape may be formed with one or more patterned semiconductor layers which are suspended above an underlying substrate via the suspension frame structure 71 that is fixedly connected to a fixed or anchor end 77. In addition, the suspension frame structure 71 may be implemented with an interior folded beam spring structure having multiple cantilevered spring length elements 73-76 connecting the proof mass 70 over an internal truss 72 to the fixed anchor 77. As illustrated, the internal truss element 72 provides a connection function for the cantilevered spring length elements 73-76, with exterior cantilevered spring length elements 73, 76 connecting the proof mass 70 to the internal truss element 72, and with interior cantilevered spring length elements 74, 75 connecting the internal truss element 72 to the fixed anchor 77. With this configuration, the proof mass 70 and internal truss element 72 will move at different speeds $S_1$, $S_2$ when the proof mass 70 is vibrating or oscillating within the desired stroke distance, where $S_1 > S_2$. As a result, the gap 79 between the proof mass 70 and cantilevered spring length element 73 shrinks as the proof mass 70 moves laterally to the left from a center position, and increases as the proof mass 70 moves laterally to the right toward the center position.

To modify the stiffness of the suspension frame structure 71 during movement of the proof mass that exceeds the desired stroke distance during normal operation, the internal truss element 72 includes compliant stop bumper or extension elements 78 that are positioned on peripheral ends of the internal truss element 72 to smooth/limit frequency changes from the proof mass 70. In selected embodiments, the compliant stop bumper or extension elements 78 include a curved or rounded profile which helps reduce impact damage from the proof mass 70 hitting the compliant stop bumper or extension elements 78. As depicted, the compliant stop bumpers 78 extend past the cantilevered spring length elements 73, 76 by a defined protrusion distance D1, leaving a reduced clearance distance D2. Insofar as the compliant stop bumpers 78 are not directly anchored to the substrate, they are not providing a hard stop functionality. In addition, it will be appreciated that the compliant stop bumpers 78 can be located at any point or location along the cantilevered spring length elements 73, 76, provided that the resulting clearance distance D2 allows the internal truss element 72 and proof mass 70 to move at different speeds when the proof mass 70 is moving within the desired stroke distance. However, when the proof mass 70 exceeds the desired stroke distance, the compliant stop bumpers 78 engage with or contact the proof mass 70, effectively shortening the length of the suspension frame structure 71 and increasing its stiffness. With increased stiffness after the compliant stop bumpers 78 contact the proof mass, further movement of the proof mass 70 toward any hard stops (not shown) is reduced or slowed, thereby reducing the likelihood of the proof mass 70 impacting the hard stops while also slightly increasing the resonant frequency (e.g., ~35 Hz) of the whole resonating structure so that drive PLL loop is still locked since it can manage this small frequency increase before it hits the hard stops and loses lock.

In accordance with the present disclosure, the compliant stops may be located or positioned in a variety of different configurations to provide the spring stiffening benefits to prevent sudden and disruptive frequency changes to device operation. For example, reference is now made to FIGS. 8A-E which illustrate simplified plan views of alternative embodiments of a MEMS gyroscope proof mass with an interior folded beam spring structure having one or more compliant stop extension elements positioned for operational engagement to smooth/limit frequency changes from the proof mass in accordance with selected embodiments of the present disclosure.

Figure 7:
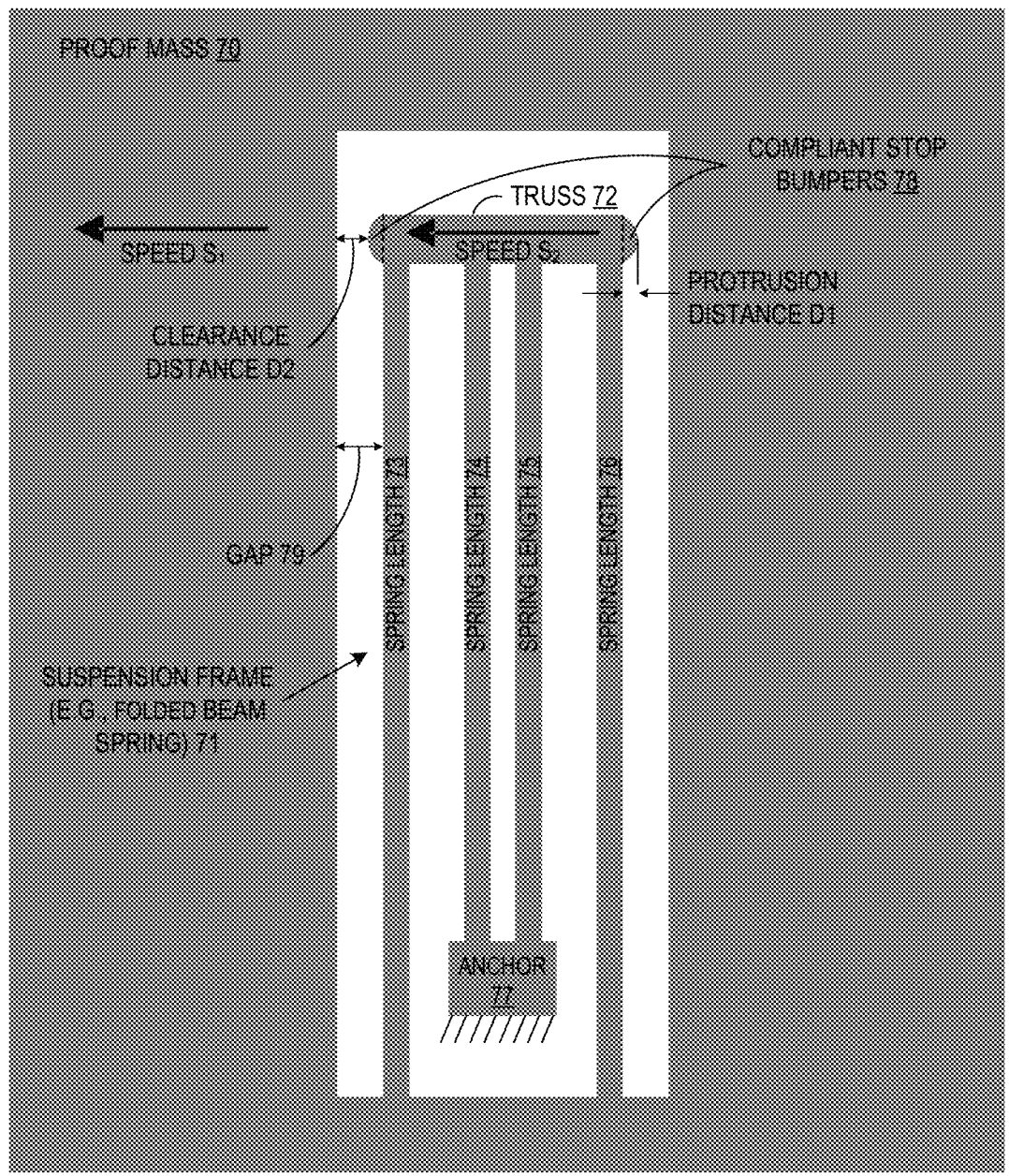
FIG. 7 illustrates a simplified plan view of a MEMS gyroscope proof mass with an interior folded beam spring structure having an internal truss with compliant stop extension elements positioned to smooth/limit frequency changes from the proof mass in accordance with selected embodiments of the present disclosure.
Figure 8A:
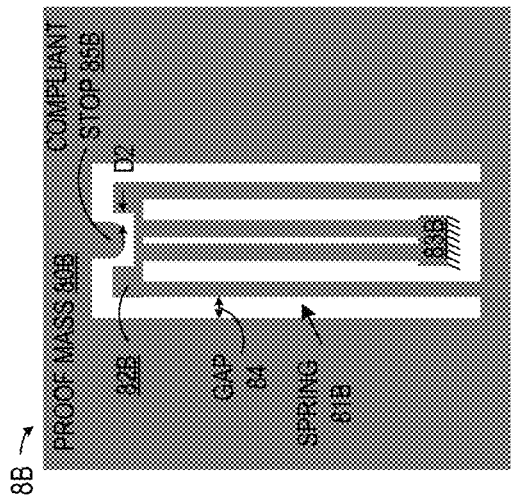
FIG. 8A-E illustrate simplified plan views of alternative embodiments of a MEMS gyroscope proof mass with an interior folded beam spring structure wherein one or more compliant stop extension elements are positioned for operational engagement to smooth/limit frequency changes from the proof mass in accordance with selected embodiments of the present disclosure.

Referring first to FIG. 8A, there is illustrated a simplified plan view 8A of a first MEMS gyroscope proof mass 80A connected over a suspension frame spring structure 81A to a fixed anchor 83A. Similar to the MEMS gyroscope proof mass shown in FIG. 7, the proof mass 80A is illustrated in simplified form as a rectangular shape with a central opening in which an interior suspension frame spring structure 81A is formed with multiple cantilevered spring length elements connecting the proof mass 80A over an internal truss 82A to the fixed anchor 83A. However, instead of forming compliant stops on the internal truss 82A, the compliant stops 85A are placed on the larger exterior moving proof mass 80A and located adjacent to peripheral ends of the internal truss element 82A. As depicted, the compliant stops 85A may include a curved or rounded profile which helps reduce impact damage from hitting the internal truss element 82A, and may extend from the proof mass 80A toward the cantilevered spring length elements 81A by a defined protrusion distance to narrow the gap 84, leaving a reduced clearance distance D2 so that, when the proof mass 80A exceeds the desired stroke distance, the compliant stops 85A engage with or contact the internal truss element 82A, effectively shortening the length of the interior suspension frame spring structure 81A and increasing its stiffness. With increased stiffness after the compliant stops 85A contact the truss 82A, further movement of the proof mass 80A toward any hard stops (not shown) is reduced or slowed, thereby reducing the likelihood of the proof mass 80A impacting the hard stops while also slightly increasing the resonant frequency of the whole resonating structure so that drive PLL loop is still locked since it can manage this small frequency increase before it hits the hard stops and loses lock.

Figure 8B:
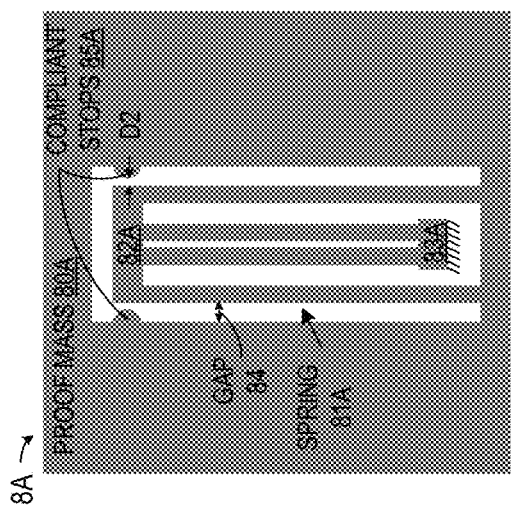

Referring now to FIG. 8B, there is illustrated a simplified plan view 8B of a second MEMS gyroscope proof mass 80B connected over a suspension frame spring structure 81B to a fixed anchor 83B. Similar to the MEMS gyroscope proof mass shown in FIG. 7, the proof mass 80B is illustrated in simplified form as a rectangular shape with a central opening in which an interior suspension frame spring structure 81B is formed with multiple cantilevered spring length elements connecting the proof mass 80B over an internal truss 82B to the fixed anchor 83B. However, instead of forming compliant stops on the internal truss 82B, a compliant stop 85B extends down from a center portion of the larger exterior moving proof mass 80B to be positioned within a gap formed in the internal truss element 82B. As depicted, the compliant stop 85B may include a curved or rounded profile which helps reduce impact damage from hitting the internal truss element 82B, and may extend down from the proof mass 80A and into the gap formed in the internal truss element 82B, leaving a reduced clearance distance D2 therebetween so that, when the proof mass 80B exceeds the desired stroke distance, the compliant stop 85B engages with or contacts the internal truss element 82B, effectively shortening the length of the interior suspension frame spring structure 81B and increasing its stiffness. With increased stiffness after the compliant stops 85B contact the truss 82B, further movement of the proof mass 80B toward any hard stops (not shown) is reduced or slowed, thereby reducing the likelihood of the proof mass 80B impacting the hard stops while also slightly increasing the resonant frequency of the whole resonating structure so that drive PLL loop is still locked since it can manage this small frequency increase before it hits the hard stops and loses lock.

Figure 8E:
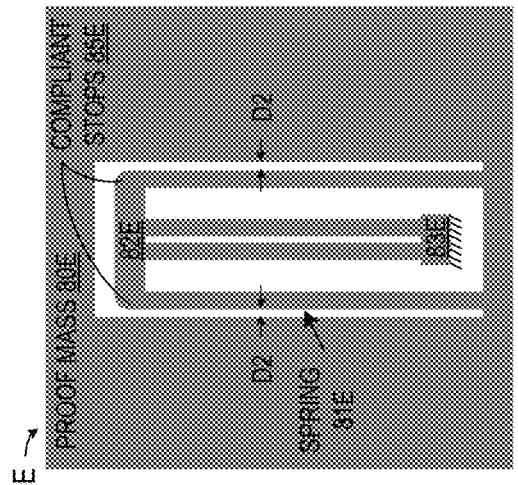
Figure 8D:
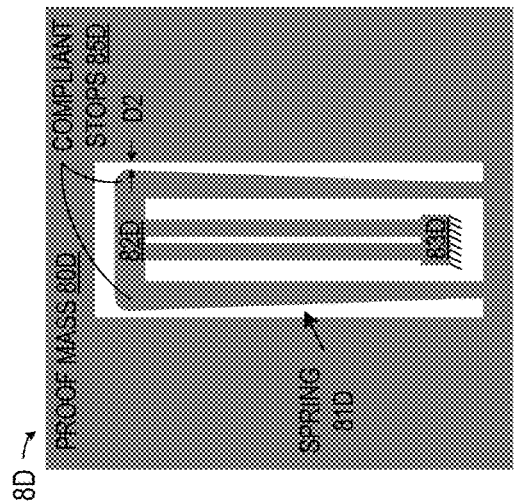
Figure 8C:
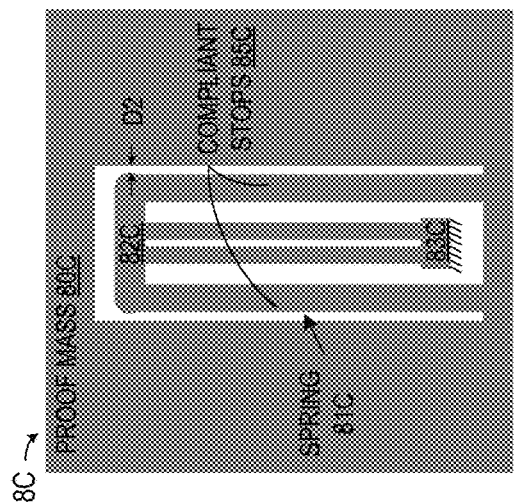

Referring now to FIG. 8C, there is illustrated a simplified plan view 8C of a third MEMS gyroscope proof mass 80C connected over a suspension frame spring structure 81C to a fixed anchor 83C. Similar to the MEMS gyroscope proof mass shown in FIG. 7, the proof mass 80C is illustrated in simplified form as a rectangular shape with a central opening in which an interior suspension frame spring structure 81C is formed with multiple cantilevered spring length elements connecting the proof mass 80C over an internal truss 82C to the fixed anchor 83C. However, instead of forming compliant stops as extensions from the internal truss 82C, the outermost cantilevered spring length elements of the interior suspension frame spring structure 81C are uniformly widened to form the compliant stops 85C, leaving a reduced clearance distance D2 between the proof mass 80C and the compliant stops 85C of the spring 81C so that, when the proof mass 80C exceeds the desired stroke distance, the compliant stops 85C engage with or contact the proof mass 80C, effectively shortening the length of the interior suspension frame spring structure 81C and increasing its stiffness. As depicted, the compliant stops 85C may include a curved or rounded profile at the upper portion which helps reduce impact damage from hitting the proof mass 80C. With increased stiffness after the compliant stops 85C contact the proof mass 80C, further movement of the proof mass 80C toward any hard stops (not shown) is reduced or slowed, thereby reducing the likelihood of the proof mass 80C impacting the hard stops while also slightly increasing the resonant frequency of the whole resonating structure so that drive PLL loop is still locked since it can manage this small frequency increase before it hits the hard stops and loses lock.

Referring now to FIG. 8D, there is illustrated a simplified plan view 8D of a fourth MEMS gyroscope proof mass 80D connected over a suspension frame spring structure 81D to a fixed anchor 83D. Similar to the MEMS gyroscope proof mass shown in FIG. 7, the proof mass 80D is illustrated in simplified form as a rectangular shape with a central opening in which an interior suspension frame spring structure 81D is formed with multiple cantilevered spring length elements connecting the proof mass 80D over an internal truss 82D to the fixed anchor 83D. However, instead of forming compliant stops as extensions from the internal truss 82D, the outermost cantilevered spring length elements of the interior suspension frame spring structure 81D have a tapered or non-uniform width to form the compliant stops 85D which narrow down the length of the suspension frame spring structure 81D, leaving a reduced clearance distance D2 between the proof mass 80D and the compliant stops 85D at the top of the spring 81D so that, when the proof mass 80D exceeds the desired stroke distance, the compliant stops 85D engage with or contact the proof mass 80D, effectively shortening the length of the interior suspension frame spring structure 81D and increasing its stiffness. As depicted, the compliant stops 85D may include a curved or rounded profile at the upper portion which helps reduce impact damage from hitting the proof mass 80D. With increased stiffness after the compliant stops 85D contact the proof mass 80D, further movement of the proof mass 80D toward any hard stops (not shown) is reduced or slowed, thereby reducing the likelihood of the proof mass 80D impacting the hard stops while also slightly increasing the resonant frequency of the whole resonating structure so that drive PLL loop is still locked since it can manage this small frequency increase before it hits the hard stops and loses lock.

Referring now to FIG. 8E, there is illustrated a simplified plan view 8E of a fifth MEMS gyroscope proof mass 80E connected over a suspension frame spring structure 81E to a fixed anchor 83E. Similar to the MEMS gyroscope proof mass shown in FIG. 7, the proof mass 80E is illustrated in simplified form as a rectangular shape with a central opening in which an interior suspension frame spring structure 81E is formed with multiple cantilevered spring length elements connecting the proof mass 80E over an internal truss 82E to the fixed anchor 83E. However, instead of forming compliant stops as extensions from the internal truss 82E, the outermost cantilevered spring length elements of the interior suspension frame spring structure 81E are shifted outwardly toward the proof mass 80E without being widened, leaving a reduced clearance distance D2 between the proof mass 80E and the compliant stops 85E of the spring 81E so that, when the proof mass 80E exceeds the desired stroke distance, the compliant stops 85E engage with or contact the proof mass 80E, effectively shortening the length of the interior suspension frame spring structure 81E and increasing its stiffness. As depicted, the compliant stops 85E may include a curved or rounded profile at the upper portion which helps reduce impact damage from hitting the proof mass 80E. With increased stiffness after the compliant stops 85E contact the proof mass 80E, further movement of the proof mass 80E toward any hard stops (not shown) is reduced or slowed, thereby reducing the likelihood of the proof mass 80E impacting the hard stops while also slightly increasing the resonant frequency of the whole resonating structure so that drive PLL loop is still locked since it can manage this small frequency increase before it hits the hard stops and loses lock.

Figure 9:
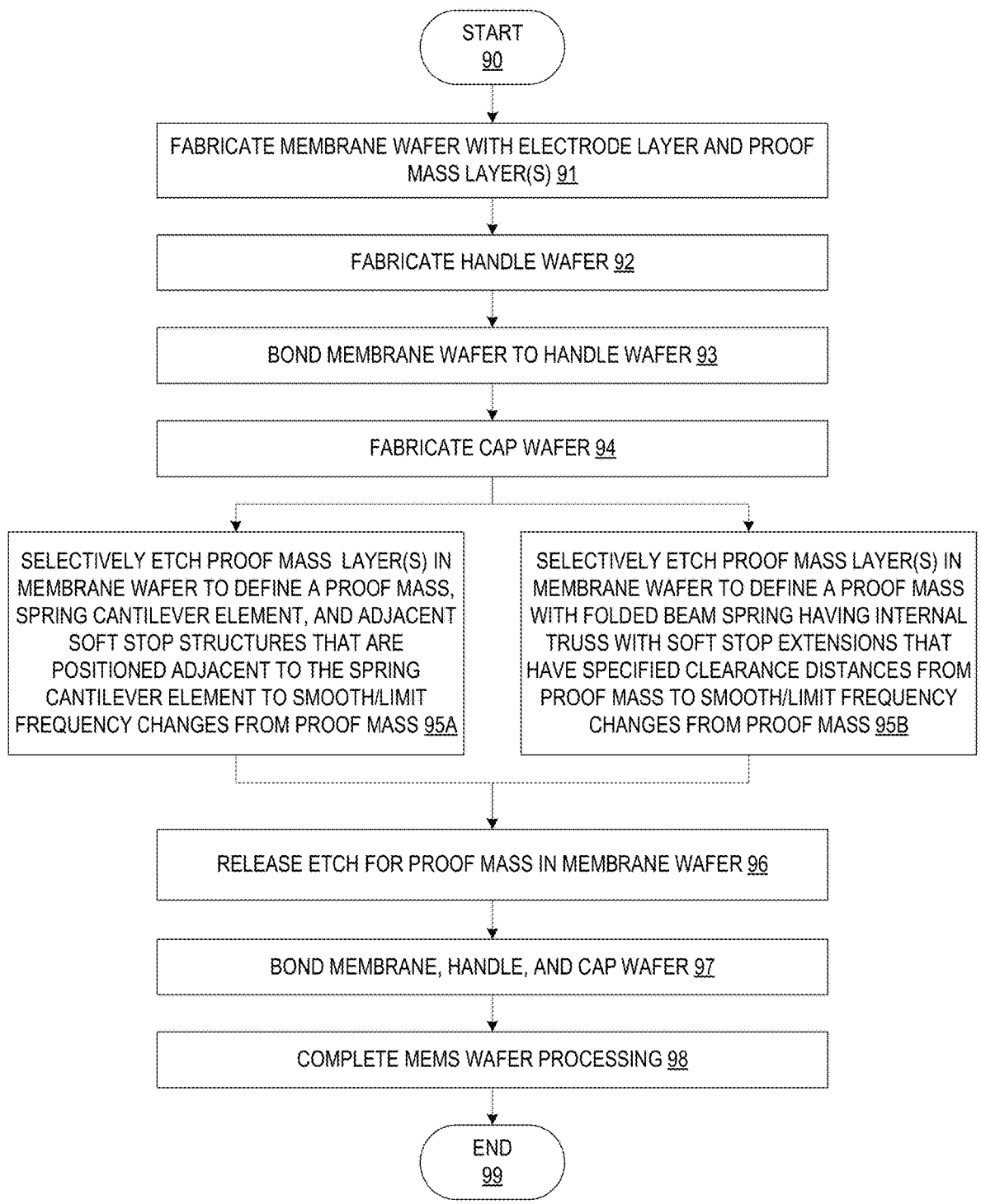
FIG. 9 depicts a simplified flow chart showing the processing steps for fabricating a MEMS sensor device with soft stops in accordance with selected embodiments of the present disclosure.

To provide additional details for an improved contextual understanding of selected embodiments of the present disclosure, reference is now made to FIG. 9 which depicts a simplified flow chart 9 showing the processing steps 90-100 for fabricating a MEMS sensor device with compliant or soft stops. After the process begins at step 90, a membrane wafer is fabricated which has one or more semiconductor proof mass layers formed over an electrode layer (step 91). In selected embodiments, the membrane wafer may be fabricated on a first crystal silicon wafer substrate using a sequence of processing steps to deposit, pattern and etch insulator layers and one or more conductive electrode layers to define MEMS wafer interconnect layers and electrode layers. Subsequently, one or more insulator layers and a monocrystalline proof mass layer are formed on the membrane wafer over the patterned electrode layers.

At step 92, a handle wafer is fabricated. As will be appreciated, the handle wafer may be fabricated separately from the member wafer, and may include a second crystal silicon wafer substrate.

At step 93, the membrane wafer is bonded to the handle wafer. In this way, the handle wafer provides mechanical support for subsequent processing of the membrane wafer. For example, the handle wafer may be bonded to a planarized dielectric layer on the membrane wafer. After bonding the membrane wafer to the handle wafer, the monocrystalline proof mass layer of the membrane wafer may be thinned to a targeted thickness to form the eventual MEMS device layer. In other embodiments, the thinning process is not required when the membrane layers formation includes growing the monocrystalline proof mass layer to the desired thickness.

At step 94, a cap wafer is fabricated. As will be appreciated, the cap wafer may be fabricated separately from the member wafer and cap wafer, and may include a third crystal silicon wafer substrate which is separately processed with a sequence of processing steps to deposit, pattern and etch insulator layers and conductive layers. For example, the cap wafer may be processed to form an array of through silicon vias (TSVs) using a deep reactive ion etch (DRIE) process to selectively etch the third crystal silicon wafer substrate, followed by a polysilicon deposition process and chemical mechanical polish step to form the TSVs.

Before or after steps 92-94, the proof mass layer(s) on the membrane wafer are selectively etched to form proof mass and compliant or soft stop structures. As disclosed herein, the specific configuration of proof mass and compliant or soft stop structures will depend on the type of transducer design. Generally speaking, the selective etching of the proof mass layer(s) may include forming a patterned transducer resist or mask layer on the proof mass layer(s) to protect selected portions of the monocrystalline proof mass layer, and then selectively etching and removing exposed portions of the proof mass layer(s) with a deep reactive ion etch (DRIE) process. The selective etching of the proof mass layer(s) defines the MEMS proof mass, cantilever spring, and soft stop elements which are fixed to the membrane wafer.

For example, at step 95A, the proof mass layer(s) in the membrane wafer may be selectively etched to define a proof mass, spring cantilever element, and adjacent soft stop structures that are positioned adjacent to the spring cantilever element to smooth or limit frequency changes from the proof mass when it exceeds the designed travel stroke distance. An example of such a selective etching from step 95A is illustrated in FIG. 6 which depicts an integrated etched proof mass 62 and spring cantilever element 63 along with an adjacent soft stop structure 65 that is positioned adjacent to the spring cantilever element 63 to smooth or limit frequency changes from the proof mass 62.

Alternatively at step 95B, the proof mass layer(s) in the membrane wafer may be selectively etched to define a proof mass with a folded beam springs having an internal truss with soft stop extensions that have specified clearance distances from the proof mass to smooth or limit frequency changes from the proof mass when it exceeds the designed travel stroke distance. An example of such a selective etching from step 95B is illustrated in FIG. 7 which depicts an integrated etched proof mass 70 and suspension frame structure 71 having an internal truss 72 with protruding soft stop structures 78 that extend laterally to leave specified clearance distances D2 from the proof mass 70 to smooth or limit frequency changes from the proof mass 70.

At step 96, a release etch process is applied to the membrane wafer to release the MEMS proof mass and cantilever spring elements, but not the soft stop structures or anchor elements. In selected embodiments, the release etch process may include a vapor release etch (VPE) that is applied to remove a sacrificial dielectric or insulator layer from below the MEMS proof mass and cantilever spring elements, thereby releasing these elements.

At step 97, the membrane wafer and handle wafer are bonded to the cap wafer. In selected embodiments, the cap wafer is bonded with the combined membrane/handle wafer using AlGe eutectic bonding.

At step 98, additional MEMs wafer processing steps are applied. For example, the cap wafer may be thinned, and contacts to the TSV and redistribution routing layers (RDLs) are fabricated before the final passivation step.

At step 99, the fabrication process ends.

Figure 10:
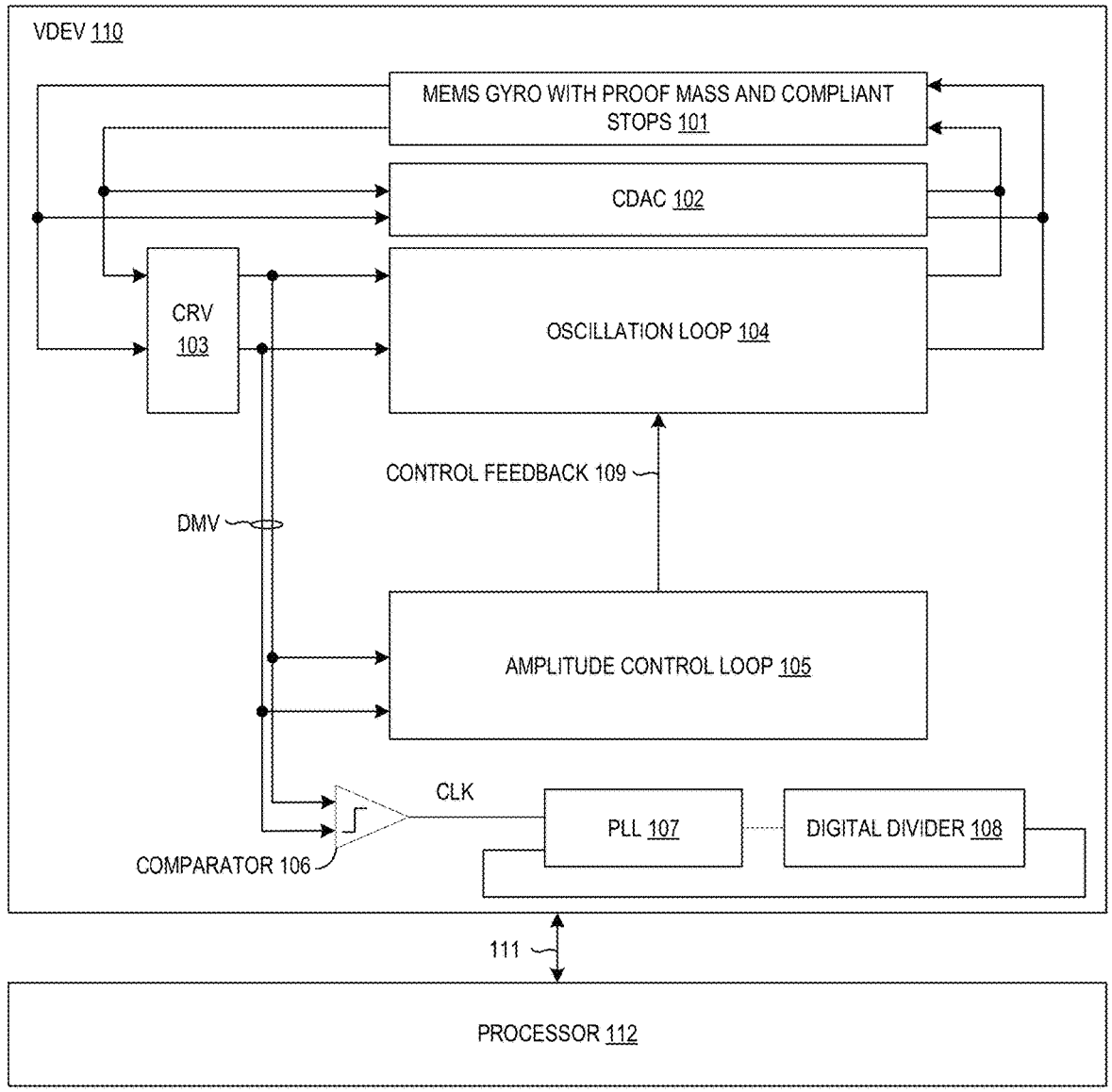
FIG. 10 depicts a schematic block diagram of a gyroscope apparatus having a vibration gyroscope MEMS device connected with a phase lock loop in accordance with selected embodiments of the present disclosure.

Turning now to FIG. 10, there is depicted a schematic block diagram of a gyroscope apparatus 100 having a vibration gyroscope MEMS device 101 connected with a phase lock loop (PLL) circuit 107 in accordance with selected embodiments of the present disclosure. As disclosed herein, the gyroscope apparatus 100 may, for example, be a mobile communication device, a global positioning device, a game controller or a security system (e.g., a car lock). The gyroscope apparatus 100 may be implemented with a vibration gyroscope device VDEV 110 that is coupled to a processor 112 and integrated together in a semiconductor device, where the processor 112 is connected to the vibration gyroscope device VDEV 110 via a gyroscope interface signal line 111. In the depicted example, the vibration gyroscope device VDEV 110 includes a MEMS gyroscope 101 which is connected over drive-sense terminals for coupling communication with drive and sense circuitry, including a cancellation digital-to-analog converter (CDAC) 102, capacitor-to-voltage converter circuit (C2V) 103, an oscillation loop 104, an amplitude control loop 105, a comparator 106, PLL circuit 107, and digital divider 108. In accordance with the present disclosure, the gyroscope MEMS device 101 includes at least a proof mass and compliant stops, but may also include hard stop structures, drive electrodes and sense electrodes.

In the depicted example, MEMS gyro 101 has DMU outputs connected to a capacitance-to-voltage unit C2V 103 which measures the capacitance of the MEMS gyroscope 101 and provides a drive measurement voltage signal DMV to the oscillation loop and amplitude control loop 105 to indicate a displacement of the proof mass in the MEMS gyroscope 101. In addition, the drive measurement voltage signal DMV is provided to the comparator 106 which is configured and connected to convert the sinusoidal oscillation into a digital PLL clock signal CLK that is provided to the PLL block which includes the PLL circuit 107 and digital divider circuit 108. The PLL circuit 107 takes the drive frequency from the drive block and generates other clocks necessary to extract the angular rate signal. The divider 108 is used to generate clock signals having a higher frequency than the drive frequency. The block that extracts the angular rate signal is not shown.

In operation, the oscillator loop 104 is configured and connected to drive the MEMS gyroscope 101 by maintaining positive feedback around the loop so that the MEMS oscillations are maintained at the MEMS natural frequency. In addition, the amplitude control loop 105 is configured and connected to generate a control feedback signal 109 which is provided to the oscillation loop 104 to control the amplitude of the oscillations at the MEMS gyro 101 to a specified or controlled level.

As will be appreciated, the internal circuitry of the oscillator loop 104 may be implemented in any manner suitable for the specific implementation. In selected embodiments, the oscillator loop 104 includes a drive actuation unit that is connected to drive the oscillations of the MEMS gyro 101, and also includes a drive measurement unit that is connected to measure the output from the MEMS gyro 101. In addition, the oscillator loop 104 may include a variable gain amplifier connected in feedback from an output of the drive measurement unit to an input of the drive actuation unit, where the variable gain amplifier is controlled by a control feedback signal 109 from the amplitude control loop 105.

In similar fashion, the internal circuitry of the amplitude control loop 105 may be implemented in any manner suitable for the specific implementation. In selected embodiments, the amplitude control loop 105 includes an amplitude extractor which is connected to receive the drive measurement voltage signal DMV, a summation circuit which subtracts the extracted amplitude from a reference amplitude, and an amplitude controller which processes the output from the summation circuit to generate the control feedback signal 109 that is provided to the oscillation loop 104.

By now, it will be appreciated that there has been provided herein a MEMS inertial sensor device and associated method for operating and fabricating same. The disclosed MEMS inertial sensor device includes a first inertial sensor or transducer element, such as a vibratory MEMS gyroscope or resonant accelerometer sensor which may include one or more drive-sense terminals and one or more sense terminals. The disclosed MEMS inertial sensor device also includes a drive actuation unit coupled to the MEMS inertial sensor, a drive measurement unit coupled to the MEMS inertial sensor, and a phase-look loop (PLL) circuit coupled to the MEMS inertial sensor. As disclosed, the MEMS inertial sensor includes a substrate, and also includes a proof mass positioned in spaced apart relationship above a surface of the substrate. In addition, the MEMS inertial sensor includes a proof mass suspension member connected on a first end to the proof mass and connected on a second end to an anchor fixed to the substrate to enable the proof mass to move in a lateral oscillating movement over the surface of the substrate. The MEMS inertial sensor also includes an over-travel hard stop structure fixed to the substrate and positioned in relation to the proof mass at a first lateral spacing distance to physically prevent lateral oscillating movement of the proof mass past a specified over-travel distance. In addition, the MEMS inertial sensor includes a compliant stop structure positioned in relation to the proof mass suspension member to physically engage with lateral oscillating movement of the proof mass suspension member past a desired stroke travel distance without physically preventing lateral oscillating movement of the proof mass, thereby stiffening a spring stiffness measure of the proof mass suspension member. In selected embodiments, the compliant stop structure may be implemented as a hard stop structure fixed to the substrate and positioned adjacent to the proof mass suspension member at a second lateral spacing distance to physically engage with lateral oscillating movement of the proof mass suspension member without physically preventing lateral oscillating movement of the proof mass. In other embodiments, the proof mass suspension member may be implemented with an interior folded beam spring structure formed within an opening of the proof mass and having an internal truss connecting the proof mass over a plurality of cantilevered beam extension elements to the anchor fixed to the substrate, and the compliant stop structure may be implemented with one or more soft stop structures integrated with the proof mass suspension member to define a clearance distance between the interior folded beam spring structure and the proof mass so that the soft stop structure physically engages with lateral oscillating movement of the proof mass suspension member without physically preventing lateral oscillating movement of the proof mass. In such embodiments, the one or more soft stop structures may be implemented with a pair of soft stop structures that are integrated with the internal truss and that extend laterally from opposed ends of the truss to define the clearance distance between the interior folded beam spring structure and the proof mass. In such embodiments, the pair of soft stop structures may each have a rounded or curved region extending laterally from the internal truss. In other embodiments, the one or more soft stop structures may be implemented with a single soft stop structure integrated with the proof mass and extending down into a gap formed in the internal truss to define, on each side of the single stop structure, the clearance distance between the interior folded beam spring structure and the proof mass. In other embodiments, the compliant stop structure is positioned in relation to the proof mass suspension member to smooth abrupt frequency changes in the lateral oscillating movement of the proof mass caused by external forces applied to the MEMS inertial sensor device. In selected embodiments, the MEMS inertial sensor device also includes a second compliant stop structure positioned in relation to the proof mass suspension member to physically engage with lateral oscillating movement of the proof mass suspension member past a desired stroke travel distance without physically preventing lateral oscillating movement of the proof mass, thereby further stiffening the spring stiffness measure of the proof mass suspension member. In selected embodiments, the compliant stop structure and the second compliant stop structure are positioned on one side of the proof mass suspension member. In other embodiments, the compliant stop structure and the second compliant stop structure are positioned on opposite sides of the proof mass suspension member.

In another form, there has been provided herein a MEMS inertial transducer device, such as a MEMS gyroscope sensor or MEMS resonant accelerator sensor, coupled to a phase-look loop (PLL) circuit and associated method of operation. The disclosed MEMS inertial transducer device includes a substrate and a proof mass positioned in spaced apart relationship above a surface of the substrate. In addition, the disclosed MEMS inertial transducer device includes a substrate-anchored over-travel stop structure positioned in relation to the proof mass at a first spacing distance to physically prevent lateral movement of the proof mass past a specified over-travel distance. The disclosed MEMS inertial transducer device also includes one or more compliant stop structures positioned in relation to the one or more substrate-anchored compliant members to physically engage with lateral oscillating movement of the one or more substrate-anchored compliant members past a desired stroke travel distance without physically preventing lateral oscillating movement of the proof mass, thereby stiffening the one or more substrate-anchored compliant members to smooth changes in the oscillation frequency by the proof mass. In selected embodiments, the compliant stop structure (s) may include first and second compliant stop structures positioned in relation to the one or more substrate-anchored compliant members to physically engage with lateral oscillating movement of the one or more substrate-anchored compliant members past a desired stroke travel distance without physically preventing lateral oscillating movement of the proof mass. In such embodiments, the first and second compliant stop structures may be positioned on one side of the one or more substrate-anchored compliant members. In other embodiments, the first and second compliant stop structures may be positioned on opposite sides of the one or more substrate-anchored compliant members. In other embodiments, the one or more compliant stop structures may be implemented with a hard stop structure fixed to the substrate and positioned adjacent to the one or more compliant stop structures at a second lateral spacing distance to physically engage with lateral oscillating movement of the one or more compliant stop structures without physically preventing lateral oscillating movement of the proof mass. In selected embodiments, the one or more substrate-anchored compliant members may include an interior folded beam spring structure formed within an opening of the proof mass and having an internal truss connecting the proof mass over a plurality of cantilevered beam extension elements to the substrate, where the one or more compliant stop structures may include one or more soft stop structures integrated with the one or more substrate-anchored compliant members to define a clearance distance between the interior folded beam spring structure and the proof mass so that the soft stop structure physically engages with lateral oscillating movement of the one or more substrate-anchored compliant members without physically preventing lateral oscillating movement of the proof mass Various illustrative embodiments of the present disclosure have been described in detail with reference to the accompanying figures. While various details are set forth in the foregoing description, it will be appreciated that the present disclosure may be practiced without these specific details, and that numerous implementation-specific decisions may be made to the disclosure described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified plan views of example MEMS sensor devices without including every device feature or geometry in order to avoid limiting or obscuring the present disclosure. In addition, the methodology of the present disclosure may be applied using materials other than expressly set forth herein. In addition, the process steps may be performed in an alternative order than what is presented. For example, the sequence of wafer bonding steps may be reversed. In addition, it is noted that, throughout this detailed description, certain layers of materials will be deposited and removed to form the depicted MEMS device wafer structures. Where the specific procedures for depositing or removing such layers are not detailed, any desired technique may be used for depositing, removing or otherwise forming such layers at appropriate thicknesses. Such details are well known and not considered necessary to teach one skilled in the art of how to make or use the present disclosure. And while the disclosed MEMS devices may be implemented with accelerometer and/or gyroscope sensors, the fabrication process described herein is not limited to such MEMS sensors or any other type of sensor, but is also applicable to any one of numerous MEMS devices that include some type of structure that is movably suspended by one or more springs and that is formed by bonding an active wafer to a reference wafer. Non-limiting examples of such devices include various types of gyroscopic sensors connected with PLL circuits used with drive and/or sense electrodes.

It is also noted that, throughout this detailed description, certain elements in the figures are illustrated for simplicity and clarity and have not necessarily been drawn to scale so that the illustrated dimensions of some of the elements in the figures may be exaggerated relative to other elements to help improve the understanding of the embodiments of the present invention. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A MEMS inertial sensor device, comprising:
   a MEMS inertial sensor;
   a drive actuation unit coupled to the MEMS inertial sensor;
   a drive measurement unit coupled to MEMS inertial sensor; and
   a phase-look loop (PLL) circuit coupled to the MEMS inertial sensor;
   wherein the MEMS inertial sensor comprises:
   a substrate,
   a proof mass positioned in spaced apart relationship above a surface of the substrate,
   a proof mass suspension member connected on a first end to the proof mass and connected on a second end to an anchor fixed to the substrate to enable the proof mass to move in a lateral oscillating movement over the surface of the substrate,
   an over-travel hard stop structure fixed to the substrate and positioned in relation to the proof mass at a first lateral spacing distance to physically prevent lateral oscillating movement of the proof mass past a specified over-travel distance, and
   a compliant stop structure positioned in relation to the proof mass suspension member to physically engage with lateral oscillating movement of the proof mass suspension member past a desired stroke travel distance without physically preventing lateral oscillating movement of the proof mass, thereby stiffening a spring stiffness measure of the proof mass suspension member,
   where the proof mass suspension member comprises an interior folded beam spring structure formed within an opening of the proof mass and having an internal truss connecting the proof mass over a plurality of cantilevered beam extension elements to the anchor fixed to the substrate, and where the compliant stop structure comprises one or more soft stop structures integrated with the proof mass suspension member to define a clearance distance between the interior folded beam spring structure and the proof mass so that the soft stop structure physically engages with lateral oscillating movement of the proof mass suspension member without physically preventing lateral oscillating movement of the proof mass,
   where the one or more soft stop structures comprise a pair of soft stop structures integrated with the internal truss and extending laterally from opposed ends of the truss to define the clearance distance between the interior folded beam spring structure and the proof mass.

2. The MEMS inertial sensor device of claim 1, where the pair of soft stop structures each comprise a rounded or curved region extending laterally from the internal truss.

3. The MEMS inertial sensor device of claim 1, where the compliant stop structure is positioned in relation to the proof mass suspension member to smooth abrupt frequency changes in the lateral oscillating movement of the proof mass caused by external forces applied to the MEMS inertial sensor device.

4. The MEMS inertial sensor device of claim 1, where the MEMS inertial sensor comprises a MEMS gyroscope sensor.

5. The MEMS inertial sensor device of claim 1, where the MEMS inertial sensor comprises a MEMS resonant accelerator sensor.

6. A MEMS inertial transducer device coupled to a phase-look loop (PLL) circuit, wherein the MEMS inertial transducer device comprises:
   a MEMS inertial transducer;
   a drive actuation unit coupled to the MEMS inertial transducer;
   a drive measurement unit coupled to MEMS inertial transducer; and
   the phase-look loop (PLL) circuit;
   wherein the MEMS inertial transducer comprises:
   a substrate;
   a proof mass positioned in spaced apart relationship above a surface of the substrate;
   one or more substrate-anchored compliant members coupled to said proof mass and configured to enable the proof mass to laterally oscillate over the surface of the substrate with an oscillation frequency;
   a substrate-anchored over-travel stop structure positioned in relation to the proof mass at a first spacing distance to physically prevent lateral movement of the proof mass past a specified over-travel distance; and
   one or more compliant stop structures positioned in relation to the one or more substrate-anchored compliant members to physically engage with lateral oscillating movement of the one or more substrate-anchored compliant members past a desired stroke travel distance without physically preventing lateral oscillating movement of the proof mass, thereby stiffening the one or more substrate-anchored compliant members to smooth changes in the oscillation frequency by the proof mass,
   where the one or more substrate-anchored compliant members comprise an interior folded beam spring structure formed within an opening of the proof mass and having an internal truss connecting the proof mass over a plurality of cantilevered beam extension elements to an anchor fixed to the substrate, and where the one or more compliant stop structures comprise one or more soft stop structures integrated with the one or more substrate-anchored compliant members to define a clearance distance between the interior folded beam spring structure and the proof mass so that the one or more compliant stop structures physically engage with lateral oscillating movement of the one or more substrate-anchored compliant members without physically preventing lateral oscillating movement of the proof mass,
   where the one or more soft stop structures comprise a pair of soft stop structures integrated with the internal truss and extending laterally from opposed ends of the truss to define the clearance distance between the interior folded beam spring structure and the proof mass.

7. The MEMS inertial transducer device of claim 6, where the pair of soft stop structures comprise first and second compliant stop structures positioned in relation to the one or more substrate-anchored compliant members to physically engage with lateral oscillating movement of the one or more substrate-anchored compliant members past a desired stroke travel distance without physically preventing lateral oscillating movement of the proof mass.

8. The MEMS inertial transducer device of claim 7, where the first and second compliant stop structures are positioned on opposite sides of the one or more substrate-anchored compliant members.

9. The MEMS inertial transducer device of claim 6, where the MEMS inertial transducer comprises a MEMS gyroscope sensor.

10. The MEMS inertial transducer device of claim 6, where the MEMS inertial transducer comprises a MEMS resonant accelerator sensor.

\* \* \* \* \*